United States Patent
Tsai et al.

(10) Patent No.: US 7,819,373 B1
(45) Date of Patent: Oct. 26, 2010

(54) DISPLAY WITH A FLUID BALANCE STRUCTURE

(75) Inventors: Stephen Tsai, Sijhih (TW); Li-Li Lai, Taipei (TW)

(73) Assignee: Hannspree, Inc., Taipei (TW)

( * ) Notice: Subject to any disclaimer, the term of this patent is extended or adjusted under 35 U.S.C. 154(b) by 0 days.

(21) Appl. No.: 12/591,458

(22) Filed: Nov. 20, 2009

(30) Foreign Application Priority Data

Aug. 27, 2009 (TW) .............................. 98128774 A

(51) Int. Cl.
*A47B 91/00* (2006.01)
(52) U.S. Cl. .................................... 248/346.2; 248/910
(58) Field of Classification Search ............... 248/346.2, 248/346.01, 346.05, 346.06, 454, 144, 910
See application file for complete search history.

(56) References Cited

U.S. PATENT DOCUMENTS

| 6,161,610 | A  | * | 12/2000 | Azar ........................... 165/80.3 |
| 6,581,888 | B1 | * | 6/2003  | Castillo ....................... 248/146 |
| 2004/0175300 | A1 | * | 9/2004 | Indermuhle et al. ......... 422/102 |
| 2008/0203263 | A1 | * | 8/2008 | Carnevali ................. 248/346.2 |

* cited by examiner

*Primary Examiner*—Ramon O Ramirez
(74) *Attorney, Agent, or Firm*—Bacon & Thomas, PLLC

(57) ABSTRACT

A display with a fluid balance structure includes a screen, a supporting base, and a fluid. The supporting base connects with the screen, and includes an arc bottom provided with a plurality of hole-partition-plates, where each hole-partition-plate neighbors, at each side, a receiving space, respectively. The fluid can flow inside the supporting base and through the plural hole-partition-plates and be selectively distributed in various receiving spaces. Therefore, by changing the center of gravity for the display, a user can use one hand to adjust the angle of inclination for the screen. Further, the display is simple in structure and easy to manufacture.

13 Claims, 5 Drawing Sheets

DISPLAY WITH A FLUID BALANCE STRUCTURE

BACKGROUND OF THE INVENTION

1. Field of the Invention

The present invention relates to a display capable of adjusting angle of inclination, and more particularly, to a display capable of adjusting angle of inclination with a fluid balance structure.

2. Description of Related Art

Conventional Cathode Ray Tube (CRT) displays are bulky, and moreover, are detrimental to human health because of radiation. Such setbacks have been seriously criticized and as such, CRT displays have been out of market gradually and replaced by flat panel displays, such as liquid crystal displays (LCDs). With continuous improvement on the manufacturing technology of displays and the mass production of LCDs, nowadays LCD flat panel displays are quite popular, and have become the mainstream in the display market.

LCDs achieve color rendering by controlling orientation of liquid crystal molecule arrangement so as to deflect light to reveal various colors. As such, a screen of the display has a certain range of view angle and a desirable angle of vision. In other words, it is critical for the design of LCDs if the angle of inclination for an LCD screen can be adjusted as required by the need of users.

Conventional LCDs for adjusting the angle of inclination of the display screen relies nothing but a resilient pivoting structure or a hinge structure, thereby the angle of inclination for the LCD screen can be controlled and fixed.

Nevertheless, such a resilient pivoting or hinge structure for the LCD screen is not only complicate structure and difficult to be made, but also costs higher. Further, in the case of violent shaking or vibrating, such resilient pivoting or hinge structure would not be stable enough and thus will cause unnecessary damages. On the other hand, when the user needs to adjust the angle of inclination of the display screen, he/she needs to use one hand to hold the base of the display and the other hand to adjust the angle of inclination of the display screen, making the user feel inconvenient. Moreover, the display screen using such a known pivoting structure always has a quite common appearance, and this dull configuration can hardly bring customers a deep impression, let alone encourage the customers to purchase the product. Therefore, the structure for adjusting the angle of inclination of the display screen, as mentioned above, still can be improved.

SUMMARY OF THE INVENTION

The present invention is to provide a display with a fluid balance structure, comprising a screen, a supporting base, and a fluid. The supporting base connects with the screen, and includes an arc bottom provided with a plurality of hole-partition-plates, where each hole-partition-plate neighbors, at each side, a receiving space, respectively.

The fluid can flow through the plural hole-partition-plates and be selectively distributed in various receiving spaces.

By means of the above-mentioned structure, a user can easily, with one hand, adjust the angle of inclination of the display screen. As compared with the conventional way for adjusting the angle of inclination of the display screen, the present invention has merits in convenience and saving efforts.

According to the present invention, the fluid may refer to liquid such as water, or solid particles such as sand or metallic particles. The arc bottom may be made of rigid material or soft material. In the case of a soft arc bottom, since the large area of arc bottom surface contacts with the surface of a table, shaking of the supporting base can be effectively refrained. The supporting base may be made of transparent material so as to have a diversification in visual effect.

The plural hole-partition-plates are arranged parallel with one another, or are arranged unparallel with one another, for instance, are isogonally arranged with one another along the arc bottom of the supporting base. Neighboring hole-partition-plates are each provided with through holes, where at least one through hole, at each of the hole-partition-plates, are staggered from each other, such that the fluid can be prevented effectively from flowing reversely.

The hole-partition-plates each includes a first partition plate and a second partition plate, where the first partition plate and the second partition plate can be engaged with and slide relatively to each other such that the second partition plate and the first partition plate can or can be aligned with, or staggered from, each other selectively. Through such hole-option switching function, when the fluid refers to a liquid, the fluid can be distributed so as to maintain the supporting base stably at a particular state.

Further, according to the present invention, the first partition plate may be provided with a recess, and that the second partition plate with a protrusion, such that the protrusions can be engaged with and slide in the recess. There is a button extending outside of the supporting base for pushing the first or second partition plate.

Other objects, advantages, and novel features of the present invention will become more apparent from the following detailed descriptions when taken in conjunction with the accompanying drawings.

DETAILED DESCRIPTION OF THE PREFERRED EMBODIMENTS

Figure 1:
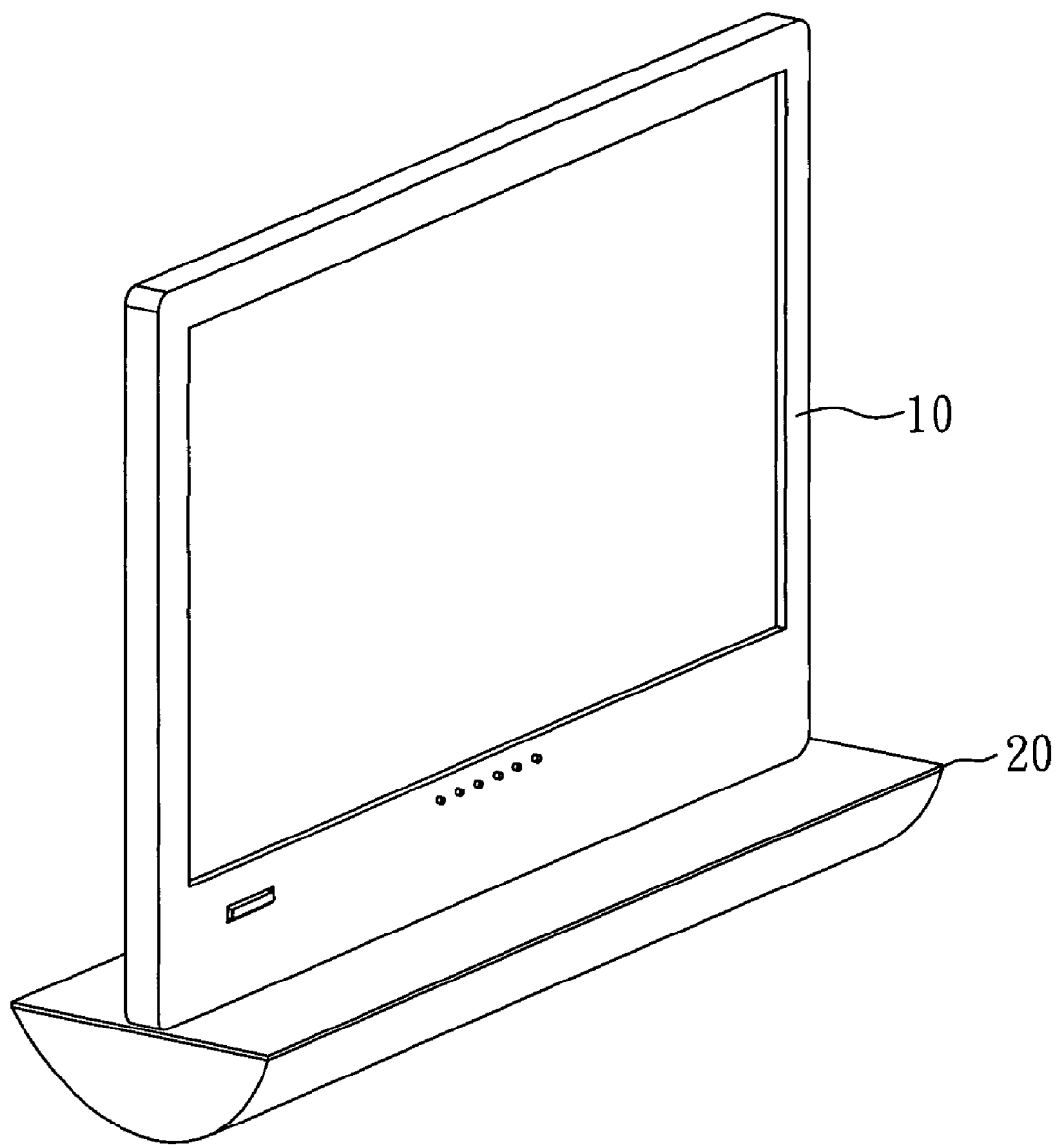
FIG. 1 is a perspective view illustrating a display with a fluid balance structure according to a first embodiment of the present invention.
Figure 2:
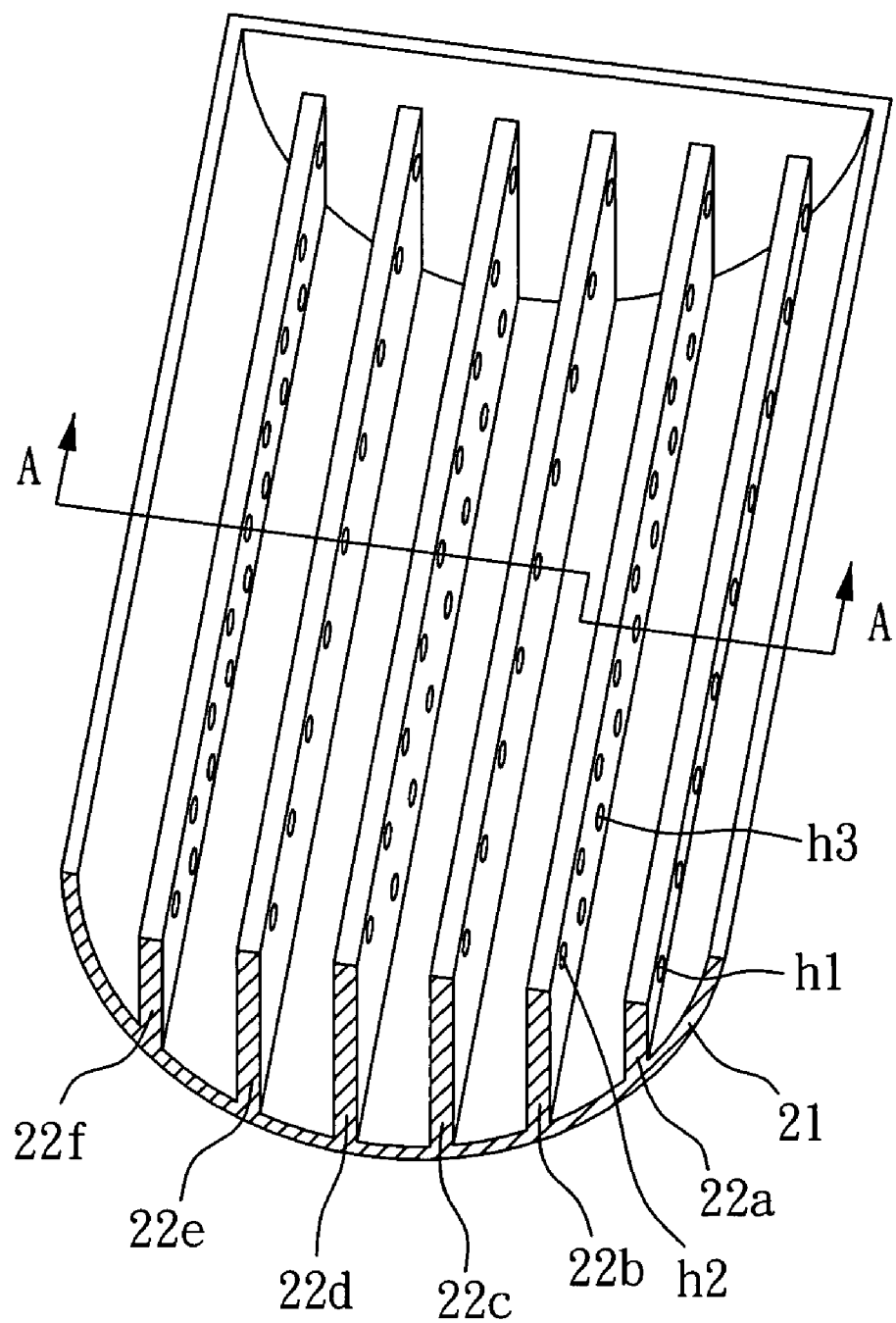
FIG. 2 is a detailed internal view illustrating a supporting base of the display according to the first embodiment of the present invention.

Referring to FIG. 1, a perspective view illustrating a display with a fluid balance structure according to a first embodiment of the present invention, a display capable of adjusting angle of inclination with a fluid balance structure comprises a screen 10 for displaying information images and a supporting base 20 for connects with the screen 10. Referring to FIG. 2, a detailed internal view illustrating a supporting base of the display, the supporting base 20 includes an arc bottom 21 and a plurality of hole-partition-plates 22a to 22f provided inside an internal space S (shown in FIG. 3) of the supporting base 20 and extending upward from the arc bottom 21, where each of the hole-partition-plates 22a to 22f is provided, at its neighboring sides, with a receiving space, respectively. In the present embodiment, the supporting base 20 is made of rigid material.

Figure 3:
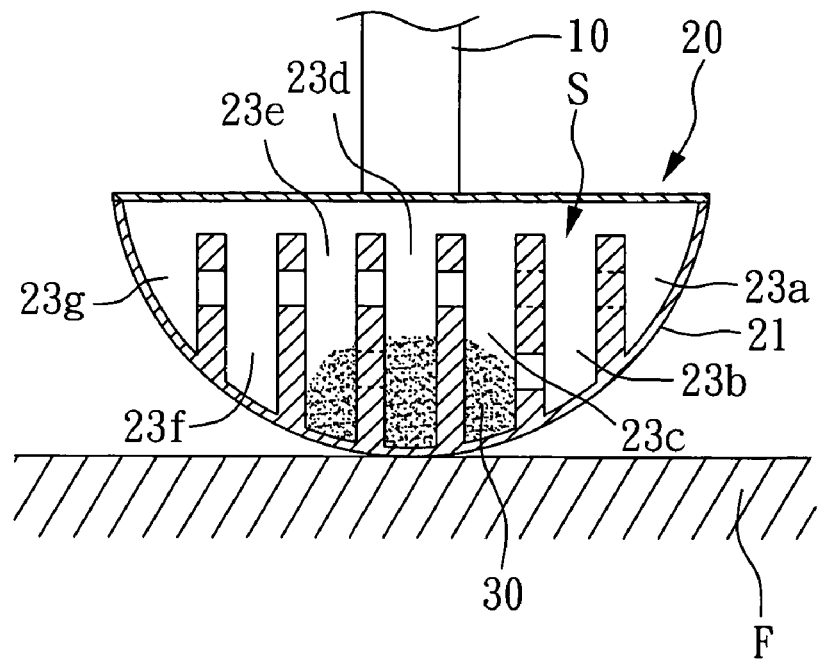
FIG. 3 is a cross-sectional view of the supporting base taken alone cutting line A-A of FIG. 2, where the supporting base stands at an upright state.

Referring to FIG. 3, a cross-sectional view of the supporting base taken alone cutting line A-A of FIG. 2, all the hole-partition-plates 22a to 22f are arranged parallelly with one another, and that each of the hole-partition-plates 22a to 22f has a plurality of through holes, where neighboring hole-partition-plates 22a to 22f are provided with through holes corresponding to each other such as h1 and h2, and with through holes staggered from each other such as h1 and h3. The two hole-partition-plates 22a,22f, which are remotest from each other, each has a receiving space, 23a or 23g defined by the hole-partition-plate 22a or 22f itself and the supporting base 20; while other receiving spaces 23b to 23f are each defined by respective two neighboring hole-partition-plates 22a to 22f.

In the internal space S of the supporting base 20 there are provided with a fluid 30, for instance sand. In virtue of its fluid characteristic, the fluid 30 can pass through the through holes of the hole-partition-plates 22a to 22f and are distributed to various receiving spaces. In the present embodiment, the arc bottom 21 has a circular surface. Of course, as required in terms of design or specific functions, the arc bottom 21 may have an elliptical surface, parabolic surface, hyperbolic surface; or a spherical surface; ellipsoidal surface, paraboloidal surface, or other equivalent curved surfaces; or even a polygonal surface similar to an arc surface. The arc bottom 21 may be made of rigid material or soft material. In the case of a soft arc bottom, since large area of the arc bottom 21 surface contacts with the surface of a table, shaking of the supporting base 20 can be effectively refrained. The supporting base 20 may be made of transparent material so as to have a diversification in visual effect.

As shown in FIG. 3, the display with the fluid balance structure is disposed on a plane F at an upright state, where the fluid 30 is uniformly distributed at center of the supporting base 20.

Figure 4:
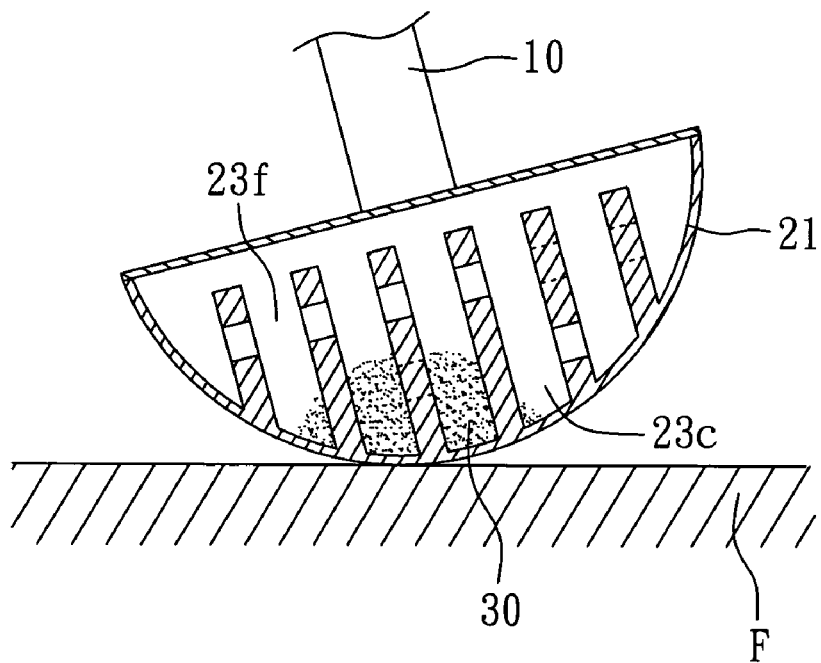
FIG. 4 is a schematic view illustrating the supporting base standing at an inclined state.

Referring to FIG. 4, a schematic view illustrating the supporting base 20 standing at an inclined state on the plane F, when a user attempts to alter the angle of inclination of the screen 10, he/she may push the screen 10 or the supporting base 20 to a specific angle, so that the fluid 30 can flow through the through holes of the hole-partition-plates 22a to 22f, and flow between one receiving space to another. Due to such re-distribution of the fluid 30, the location of the center of gravity for the display has thus changed where the display finally stabilizes at an inclined state, as shown in FIG. 4. Apparently, the fluid 30 moves from the receiving space 23c to the receiving space 23f. In particular, the above-mentioned manipulation can be achieved merely by using one hand for the user.

It is understood, therefore, that the display according to the present embodiment is a simple in structure, but also is convenient to adjust the angle of inclination for the display screen with one hand. Besides, such unique design with extremely fantastic configuration and simplicity results in a novel appearance and brings consumers an appeal feeling.

Figure 5:
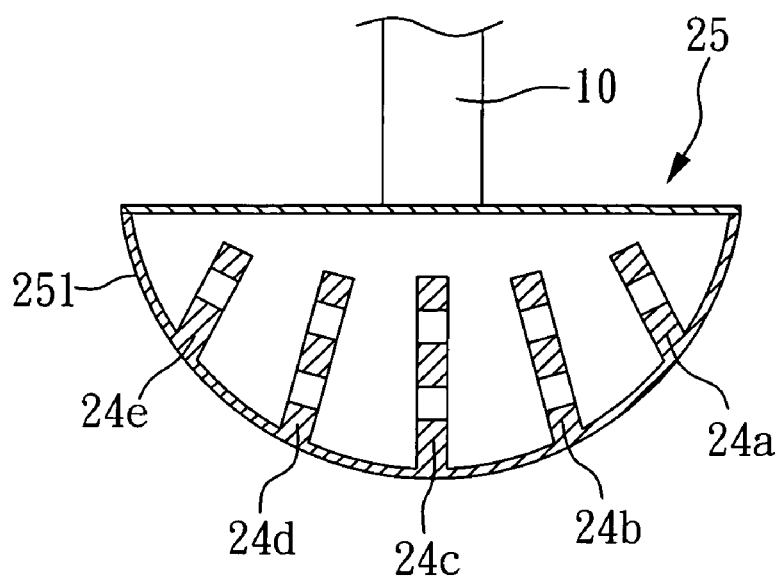
FIG. 5 is a schematic view illustrating the supporting base of a display with a fluid balance structure according to a second embodiment of the present invention.

Now referring to FIG. 5, a schematic view illustrating a supporting base 25 of the display according to a second embodiment of the present invention, the feature of the present embodiment resides in that there are hole-partition-plates 24a to 24e arranged along an arc bottom 251 of the supporting base 25, where the hole-partition-plates 24a to 24e are arranged unparallel with one another, for instance, are isogonally arranged with one another according to the present embodiment.

Figure 6:
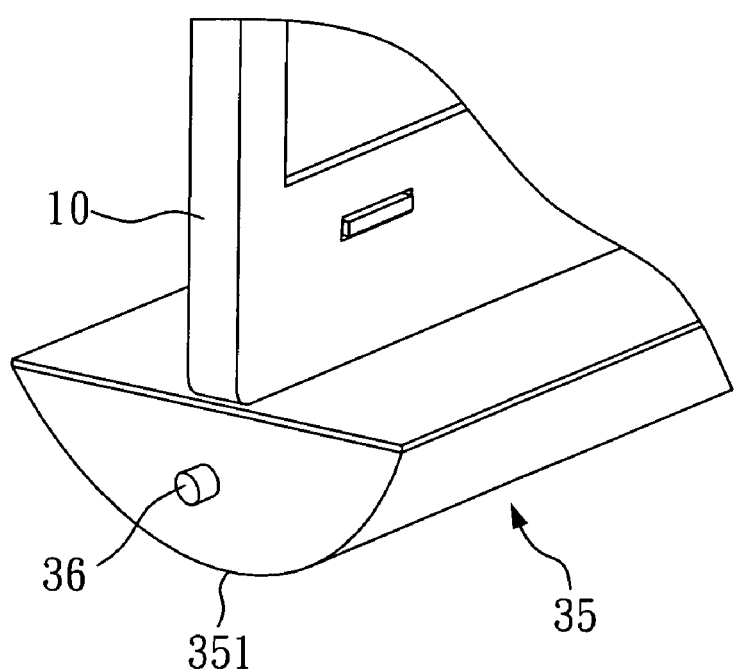
FIG. 6 is a partial perspective view illustrating a display with a fluid balance structure according to a third embodiment of the present invention.
Figure 7:
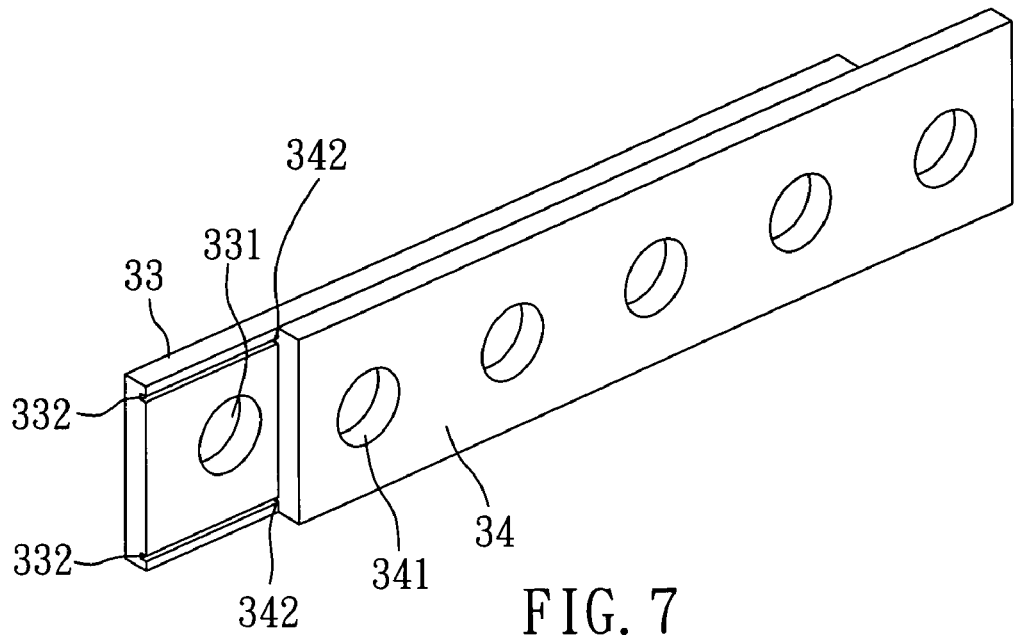
FIG. 7 is a schematic view illustrating the first state of a hole-partition-plate according to the third embodiment of the present invention.

Further, referring to FIG. 6, a partial perspective view illustrating a display according to a third embodiment of the present invention, and to FIG. 7, a schematic view illustrating the first state of a hole-partition-plate, a supporting base 35 is made of a transparent material, and a button 36 extends outside of the supporting base 35. There are hole-partition-plates each including a first partition plate 33 and a second partition plate 34, where the first partition plate 33 is provided with a paired recesses 332 and the second partition plate 34 with a paired protrusions 342, such that the protrusions 342 can be engaged with and slide in the recesses 332. As a result, there are two kinds of states occurred for the hole-partition-plate, namely, through a relative slide action between the second partition plate 34 and the first partition plate 33, the positions of holes 341,331 thereon can or cannot be aligned with each other.

Figure 8:
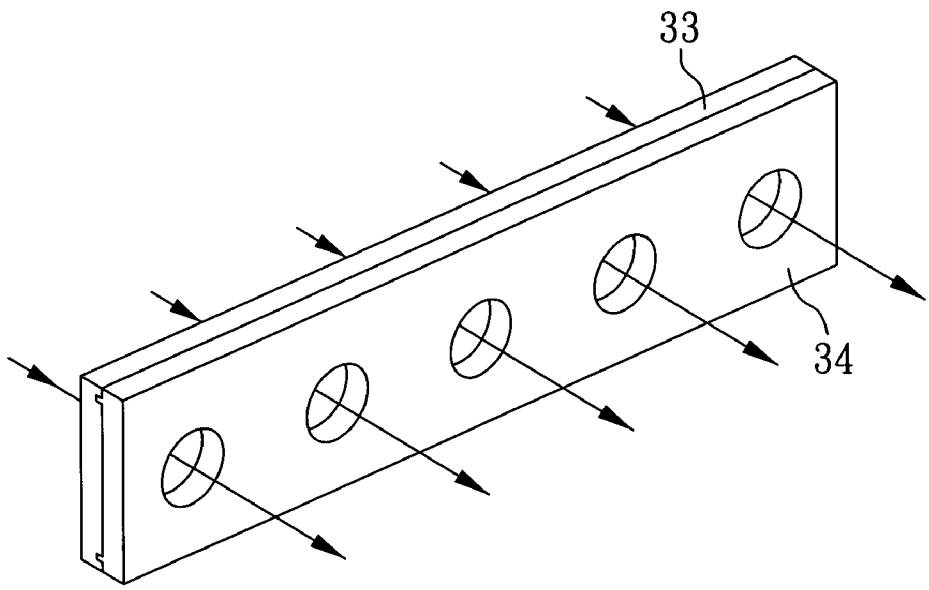
FIG. 8 is a schematic view illustrating a second state of the hole-partition-plate according to the third embodiment of the present invention.

As shown in FIG. 7, the holes 341,331 of the second partition plate 34 and the first partition plate 33 are not aligned with each other, so that the fluid 30 cannot flow through the hole-partition-plate. Further, referring to FIG. 8, a schematic view illustrating the second state of the hole-partition-plate, when the second partition plate 34 and the first partition plate 33 move relative to each other, for instance through a manipulator (the button 36 according to the present embodiment) for pushing the first or second partition plate 33,34, the holes 341,331 thereof are then aligned with each other, so that the fluid 30 can flow through the holes 341,331 of the partition plates 34,33 and be re-distributed in the receiving spaces 23a to 23g. This can also achieve the purpose of adjusting the angle of inclination of the display screen. In the present embodiment, the manipulator refers to the button 36. Such a design is particularly appropriate for the occasion when liquid, for instance water, is used as the fluid. This is because liquid has a stronger flowability, and without such a hole-option switching function, the liquid will be difficult to remain at a particular position.

Although the present invention has been explained in relation to its preferred embodiments, it is to be understood that many other possible modifications and variations can be made without departing from the scope of the invention as hereinafter claimed.

What is claimed is:

1. A display with a fluid balance structure, comprising:
   a screen;
   a supporting base, connecting with the screen, and including an arc bottom provided with a plurality of hole-partition-plates, where each hole-partition-plate neighbors, at each side, a receiving space, respectively; and
   a fluid, flowing through the plural hole-partition-plates and being selectively distributed in various receiving spaces wherein by changing the center of gravity of the display, the screen angle of inclination is adjusted by the new distribution of the fluid between the spaces.

2. The display with a fluid balance structure as claimed in claim 1, wherein the fluid is a liquid.

3. The display with a fluid balance structure as claimed in claim 1, wherein the fluid is solid particle.

4. The display with a fluid balance structure as claimed in claim 1, wherein the plural hole-partition-plates are arranged parallel with one another.

5. The display with a fluid balance structure as claimed in claim 1, wherein the plural hole-partition-plates are arranged unparallel with one another.

6. The display with a fluid balance structure as claimed in claim 5, wherein the plural hole-partition-plates are isogonally arranged with one another along the arc bottom of the supporting base.

7. The display with a fluid balance structure as claimed in claim 1, wherein neighboring hole-partition-plates are each provided with through holes, where at least one through hole, at each of the hole-partition-plates, are staggered from each other.

8. The display with a fluid balance structure as claimed in claim 1, wherein the arc bottom is made of rigid material.

9. The display with a fluid balance structure as claimed in claim 1, wherein the arc bottom is made of soft material.

10. The display with a fluid balance structure as claimed in claim 1, wherein the hole-partition-plates each includes a first partition plate and a second partition plate, the first partition plate and the second partition plate can be engaged with and slide relatively to each other such that the second partition plate and the first partition plate can be aligned with, or staggered from, each other selectively.

11. The display with a fluid balance structure as claimed in claim 10, wherein the first partition plate is provided with a recess, and the second partition plate with a protrusion, such that the protrusion can be engaged with and slide in the recess.

12. The display with a fluid balance structure as claimed in claim 10, further comprising a button extending outside of the supporting base for pushing the first or second partition plate.

13. The display with a fluid balance structure as claimed in claim 1, wherein the supporting base is made of transparent material.

* * * * *